Figure 1:
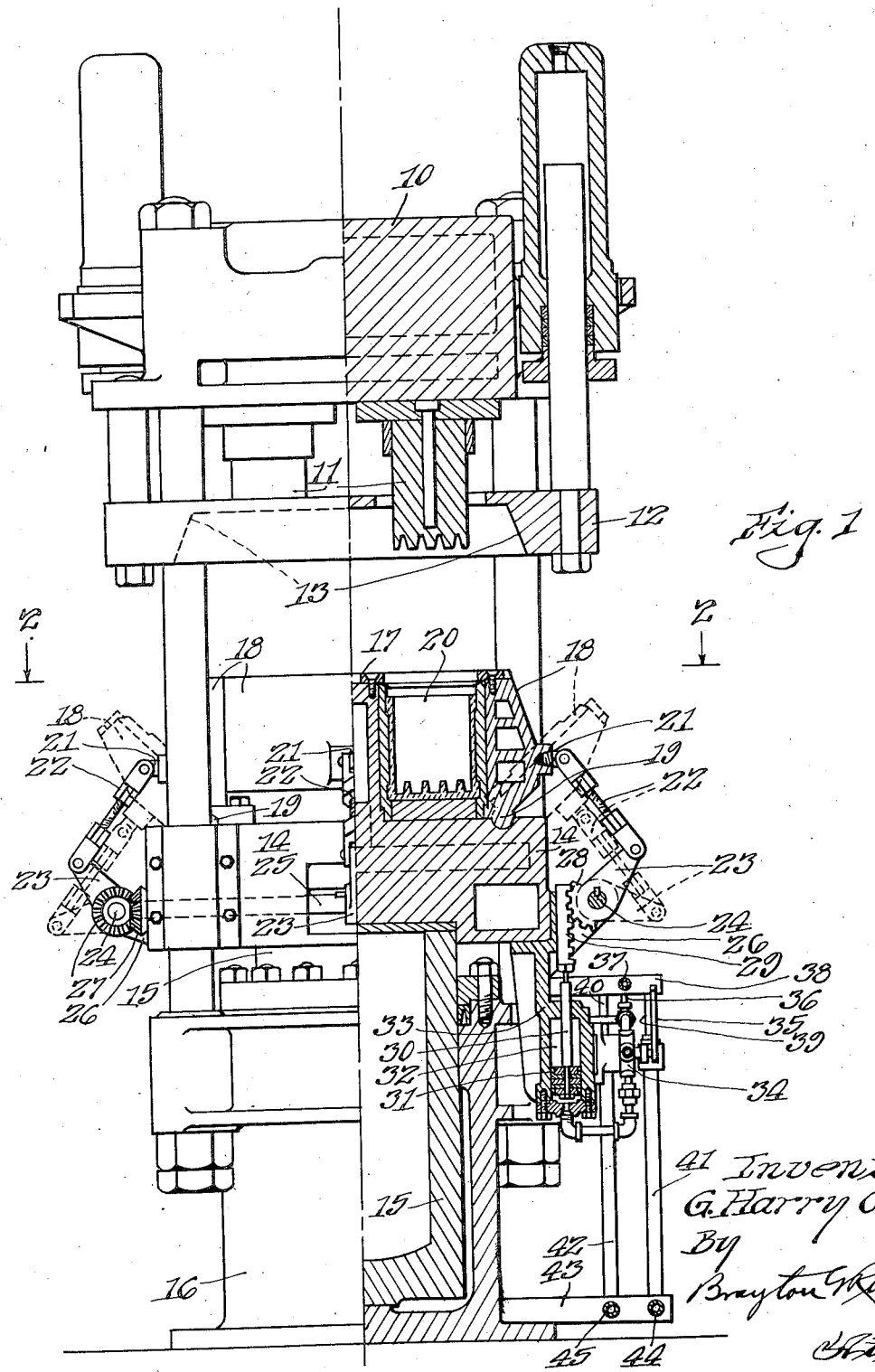

April 21, 1936.  G H. CASE  2,038,205
MOLDING PRESS
Filed Aug. 24, 1933  2 Sheets-Sheet 1

Inventor:
G. Harry Case
By
Brayton G Richards
Atty.

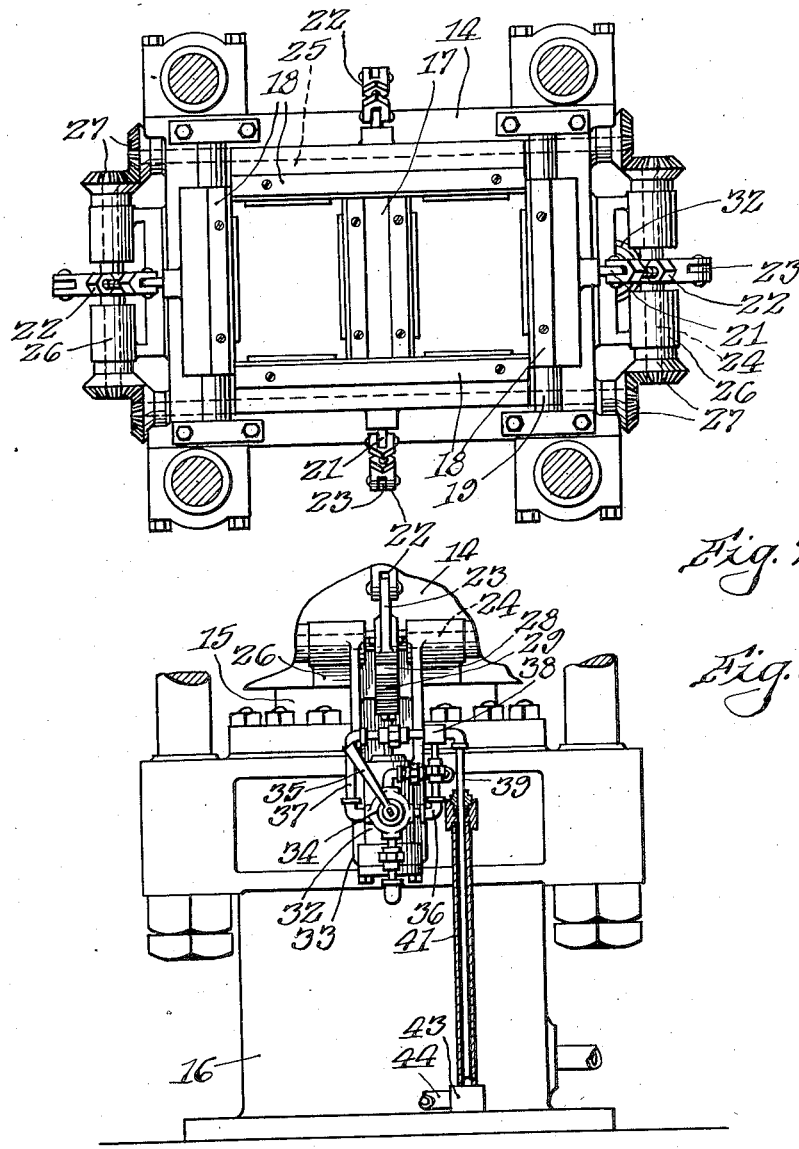

Patented Apr. 21, 1936

2,038,205

UNITED STATES PATENT OFFICE 2,038,205

MOLDING PRESS

G. Harry Case, Moline, Ill., assignor, by mesne assignments, to Ahlbell Battery Container Corporation, Waukegan, Ill., a corporation of Illinois Application August 24, 1933, Serial No. 686,493

5 Claims. (Cl. 18—19)

The invention relates to improvements in molding presses and has for its primary object the provision of an improved molding press so constructed and arranged as to facilitate the removal of molded objects therefrom.

Another object of the invention is the provision of means whereby the sides of the mold member employed may be simultaneously opened and closed to facilitate removal of the molded articles.

Other objects will appear hereinafter.

The invention consists in the combinations and arrangements of parts hereinafter described and claimed.

The invention will be best understood by reference to the accompanying drawings forming a part of the specification, and in which Fig. 1 is a front view, shown partially in section, of a molding press embodying the invention;

Fig. 2, a horizontal section taken substantially on line 202 of Fig. 1; and

Fig. 3, a partial side view of the press, with parts shown in section.

The embodiment of the invention illustrated in the drawings comprises a suitable supporting frame having a heated core head 10 mounted at the top thereof and adapted and arranged to support depending core members 11. Associated with the core head 10 is an upwardly yielding collar or frame 12 having cam surfaces 13, as shown.

A co-operating mold table or support 14 is arranged to move vertically in the frame, being supported on the upper end of a hydraulic piston 15 operating in a hydraulic cylinder 16 formed in the base of the frame. A suitable mold member 17 is formed as shown on the mold table 14 and provided with outwardly and downwardly swinging heated sides 18 hinged at 19 to the upper surface of the mold table 14. As shown, the mold sides 18 are provided with beveled outer upper surfaces to co-operate with the cam surfaces 13 to insure closing the mold sides in operation.

The arrangement already disclosed constitutes a well known molding press adapted and arranged to form battery boxes 20 by placing a suitable quantity of material in the mold member and then forcing the mold member upwardly into co-operative relationship with the core members 11 so that vulcanized battery boxes 20 will be formed in the mold member 17, as will be readily understood by those skilled in this art. The construction and arrangement already described is an old and well known one for the purpose and constitutes no part of my present invention except insofar as the same co-operates with the construction and arrangement to be presently described.

Each of the side walls 18 is provided with a central stud 21 connected by an adjustable link 22 with a corresponding rocker arm 23 fixed to corresponding rocker shafts 24 and 25 mounted in brackets 26 secured to the corresponding sides of the mold table 14, the rocker shafts 24 and 25 being thus arranged to surround the four sides of the mold table as indicated.

The rocker shafts 24 and 25 are connected as shown by bevel gears 27 so that said rocker shafts are thus compelled to operate or rock in unison with each other. The rocker arm 23 on the rocker shaft 24 located at the front of the machine carries a segmental gear 28 meshing with a vertically slidable rack bar 29 at the upper end of a piston rod 30 carried by a piston 31 operating in the hydraulic cylinder 32 formed on a bracket 33 secured as shown to the corresponding underside of the mold table 14. The cylinder 32 is equipped with an ordinary four-way valve 34 operable by a suitable handle 35 and supply and exhaust connecting pipes 36 and 37 lead from opposite sides of the valve casing 34 to and through a supporting bar 38 being connected, respectively, with supply and exhaust pipes 39 and 40 as indicated. The pipes 39 and 40 telescope with corresponding pipes 41 and 42 leading from and through a supporting bar 43 connected, respectively, with main supply pipe 44 and exhaust pipe 45. The arrangement is such, as will readily be understood, that by shifting the valve handle 35, the hydraulic piston 31 may be forced upwardly or downwardly in the cylinder 32, as will be readily understood by those skilled in the art. Upward movement of the piston 31 will cause simultaneous outward rocking of the rocker arms 23 thereby simultaneously swinging the sides 18 of the mold member 17 outwardly and downwardly to facilitate removal of the molded articles therefrom. Likewise, when the valve handle 35 is oppositely shifted, reverse movement of the piston 31 will be caused and the sides 18 of the mold member closed. In this way simultaneous opening and closing of the sides of the mold member can be readily caused by the operator of the press from a position directly in front thereof and the accurate closing of all sides of the mold will be insured so as to prevent injury to the press in operation. Thus, the removal of the molded articles from the press and the general operation thereof will be greatly facilitated. The telescoping pipes 39—41 and 40—42 permit of the necessary movements of the mold table 14 during the normal operation of the press. The specific form and arrangement of parts is a simple and effective one for the purpose.

While I have illustrated and described the preferred form of construction for carrying my invention into effect, this is capable of variation and modification without departing from the spirit of the invention. I, therefore, do not wish to be limited to the precise details of construction set forth but desire to avail myself of such variations and modifications as come within the scope of the appended claims.

1. A molding press comprising a frame; an upper core member in said frame; a vertically movable mold support and means for moving the same in said frame; a co-operating mold member on said support having a plurality of outwardly and downwardly swinging sides; a rocker shaft on said mold support for each mold side; a rocker arm on each shaft operatively connected with the corresponding mold side; a hydraulic cylinder and piston on said mold support and operatively connected with said rocker shafts; and a valve and pipe connection mounted on and moving with said mold support and connected with and operating said piston and cylinder.

2. A molding press comprising a frame; an upper core member in said frame; a vertically movable mold support and means for moving the same in said frame; a co-operating mold member on said mold support having all of its sides mounted to swing outwardly and downwardly; rocker shafts mounted around the sides of said mold support and operatively connected at their ends by bevel gears for simultaneous operation; a rocker arm on each rocker shaft operatively connected with the corresponding mold side for manipulation thereof; a gear on one of said rocker shafts; a vertically reciprocating rack bar meshing with said gear; a vertically reciprocating piston operatively connected with said rack bar; a cylinder for said piston and mounted on said mold support; a valve mounted on said support and operatively connected with and controlling the operations of said piston and cylinder; and telescoping supply and exhaust pipes operatively connected with said valve.

3. The combination with a mold having its sides mounted for outward and downward swinging; a plurality of rocker shafts surrounding said mold and connected together for simultaneous operation; a rocker arm on each shaft operatively connected with the corresponding mold side; a gear on one of said rocker shafts; a rack bar meshing with said gear; a hydraulic piston and cylinder operatively connected with said rack bar; and a valve and pipe connection for operating said piston and cylinder for simultaneous manipulation of said mold sides.

4. A molding press comprising a frame; an upper core member in said frame; a vertically movable mold support and means for moving the same in said frame; a co-operating mold member on said support having a plurality of movable sides; and actuating means independent of said moving means mounted on and moving with said mold support and operatively connected with and moving said sides, and adapted and arranged to close the mold sides when the mold support is stationary and hold them closed both while stationary and during the vertical movements of said mold.

5. A molding press comprising a frame; a core member in said frame; a mold support in said frame movable into and out of co-operating relationship with said core member; a mold on said support co-operating with said core and having a plurality of movable sides; and power means independent of said moving means for opening and closing said mold sides while the support is stationary, and holding said mold sides closed during movements of said support.

G. HARRY CASE.